United States Patent
Priest (10) Patent No.: US 7,246,968 B1
(45) Date of Patent: Jul. 24, 2007

(54) STORM SEWER INLET GRATE SYSTEM

(76) Inventor: Gregory Lawrence Priest, 744 Amanda Pines Dr., Parker, CO (US) 80138

( * ) Notice: Subject to any disclaimer, the term of this patent is extended or adjusted under 35 U.S.C. 154(b) by 0 days.

(21) Appl. No.: 10/872,643

(22) Filed: Jun. 21, 2004

(51) Int. Cl.
*E03F 5/06* (2006.01)
*E01C 11/22* (2006.01)

(52) U.S. Cl. .................... 404/2; 404/4; 404/5; 210/163

(58) Field of Classification Search ............... 404/2–5; 210/163–166, 97, 232
See application file for complete search history.

(56) References Cited

U.S. PATENT DOCUMENTS

| | | | | |
|---|---|---|---|---|
| 248,559 | A * | 10/1881 | Jackson ..................... | 4/220 |
| 809,201 | A | 1/1906 | Lutz | |
| 4,588,325 | A * | 5/1986 | Seefert ...................... | 405/46 |
| 5,133,619 | A | 7/1992 | Murfae | |
| 5,403,474 | A | 4/1995 | Emery | |
| 5,480,254 | A | 1/1996 | Autry | |
| 5,632,888 | A * | 5/1997 | Chinn et al. ............... | 210/163 |
| 5,954,952 | A * | 9/1999 | Strawser, Sr. .............. | 210/164 |
| 6,054,964 | A * | 4/2000 | Hansen et al. ............. | 343/752 |
| 6,106,707 | A | 8/2000 | Morris | |
| 6,231,758 | B1 | 5/2001 | Morris | |
| 6,261,445 | B1 * | 7/2001 | Singleton ................... | 210/163 |
| 6,368,499 | B1 | 4/2002 | Sharpless | |
| 6,709,579 | B1 * | 3/2004 | Singleton et al. .......... | 210/163 |
| 6,712,976 | B2 | 3/2004 | Manzone | |
| 6,824,677 | B2 * | 11/2004 | Martinez .................... | 210/97 |
| 6,869,526 | B2 * | 3/2005 | Sharpless ................... | 210/164 |
| 7,070,691 | B2 * | 7/2006 | Lindemulder .............. | 210/164 |
| 2002/0159833 | A1 * | 10/2002 | Nabeshima ................. | 404/2 |
| 2003/0047497 | A1 | 3/2003 | Harris | |
| 2003/0132150 | A1 | 7/2003 | Happel | |
| 2003/0172277 | A1 * | 9/2003 | Shaw et al. ................ | 210/163 |
| 2004/0047687 | A1 * | 3/2004 | Sychra ....................... | 405/30 |

FOREIGN PATENT DOCUMENTS

DE 3925353 A1 2/1991

* cited by examiner

*Primary Examiner*—Raymond W Addie
(74) *Attorney, Agent, or Firm*—Henry L. Smith, Jr.

(57) ABSTRACT

A storm sewer inlet grate is provided, which is temporary and removable, to keep trash and debris and eroded soil out of a storm sewer. There are two parts: a rectangular box made of steel re-bars and steel mesh, and surrounding mesh bags filled with gravel and made of wire mesh. The device is placed in a gutter parallel to and against the street curb opening of the storm sewer drain. The mesh bags are easily removable one by one.

20 Claims, 6 Drawing Sheets

STORM SEWER INLET GRATE SYSTEM

BACKGROUND

1. Field of Invention

The field of the Invention is a group of devices designed to prevent trash and eroded soil from being washed into a storm sewer drain thereby stopping up the drain or filling with trash the storm sewer or stream into which the storm sewer flows.

2. Description of Prior Art

Over the years, many devices have been developed for preventing trash and eroded soil from being washed into storm sewers. Representative of prior art are the following patents. U.S. Pat. No. 809,201, Jan. 2, 1906, to Lutz, discloses a boxlike device with metal grates which is installed inside a storm sewer inlet. U.S. Pat. No. 5,403,474, Apr. 4, 1995, to Emery, discloses a metal mesh box filled with gravel which may be placed in a gutter and up against a storm sewer inlet. Because this device is one large box full of gravel, it would be very heavy to move and install. U.S. Pat. No. 5,480,254, Jan. 2, 1996, to Autry, discloses a metal box containing gravel held in place by wire mesh which is placed over a storm sewer inlet; again, this device would be very difficult to install and remove because of its weight, since the frame is heavy and all the heavy gravel must be removed at the same time. U.S. Pat. No. 6,106,707, Aug. 22, 2000, to Morris, discloses a metal and wire mesh basket containing gravel which must be installed down into a storm sewer opening. Publication U.S. 2003/0047497, Mar. 13, 2003, by Harris, discloses a curb inlet catch basin filter which is hung inside of, and down into, a storm sewer inlet; apparently debris would build up in this filter and restrict water flow, and the debris would be difficult to remove. Many of these inventions are expensive and complicated to make. They may also be difficult to install, remove, or clean out. Many of these inventions are not always effective in preventing debris and trash from being washed into storm sewer inlets, and they do not deal well with large volumes of water from strong storms.

A prior art device of the Inventor comprised a long 6 foot rectangular box of small re-bars (⅜ inch) covered with thin "chicken wire" on the top and front surfaces (away from the curb storm sewer inlet). Around the three sides away from the curb was cloth "silt fence". The device was too weak to sustain a vehicle driving over it, and the cloth silt fence was inadequate regarding strength, durability and ability to handle heavy flows of water. Its size made it difficult for one person to handle.

SUMMARY OF INVENTION

Figure 1:
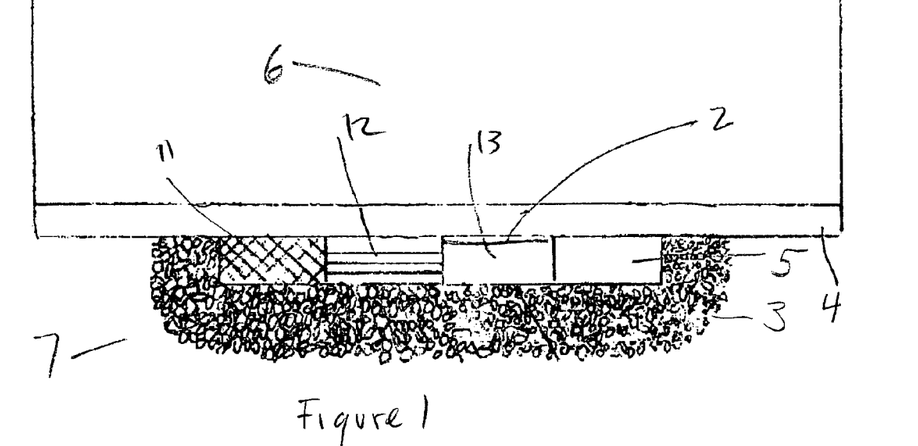
FIG. 1 shows a view looking down on a curb and street with the Invention in place around a curb storm drain inlet. Up against the storm sewer inlet is the box of the Invention, and it is surrounded by the mesh bags from one end of the box to the other.

The Invention is a storm sewer inlet grate which is temporary and easily removable from a storm sewer opening. It is designed to prevent trash and debris and eroded soil from being washed into a storm sewer inlet, especially in areas of home or building construction which may produce building debris and eroded soil due to the fact that the soil is bare, or is being graded for construction purposes, and may not be covered with grass or plants which prevent soil erosion. The storm sewer inlet which the Invention is designed to work with is typically a rectangular hole in the curb of the street at the edge of the street. The gutter at the side of the street brings storm water into the storm sewer inlet. The device comprises two basic parts: (a) a rectangular box made up of steel re-bars and steel mesh connected together typically by welding, and (b) several surrounding gravel filled bags of typically ¾ inch gravel, where the bag is made of wire mesh with holes small enough to contain the gravel. Part (a) is placed in the gutter parallel to and against the curb opening of the storm sewer drain. The mesh bags (b) are then placed around the box (a) and touching the curb on both ends of the box. The overall configuration is shown in FIG. 1. The remaining Figures show various versions of the box, with an open top, a top with x-shaped metal mesh grid, and a top with parallel bars. FIG. 1 shows the possible different tops of the box in various portions of the top for illustration only. In reality the top of the box would have only one type of top surface. A particular box would have only one design for the top. In operation, the mesh bags and the front and side surfaces of the box block most of the eroded soil and trash and debris, and water flows through the bags and the box. The box may have a more open top to let overflow water go into the curb drain more easily in case of a large water flow from a storm. The box and mesh bags are strong and heavy enough not to be displaced by flowing water, and not to be crushed by a vehicle passing over them.

OBJECTS AND ADVANTAGES

The objects and advantages of the present Invention are:

1. To provide a device which prevents trash, debris, and eroded soil from being washed into a storm drain.

2. To provide a device which is easily installed and removed in a storm drain inlet, typically an opening in a curb on the side of a street.

3. To provide a device which is easy to manufacture from commonly available materials.

4. To provide a device which is inexpensive to manufacture.

5. To provide a device to enable homebuilders or other construction personnel to conform to local regulations designed to prevent eroded soil and trash from being washed into storm sewers in construction areas.

6. To provide a device which will prevent eroded soil and trash from being washed into a storm sewer inlet, yet which allows for the overflow of heavy volumes of water from a strong storm, without excessively obstructing such strong storm runoff, with resulting area flooding.

7. To provide a device which is strong enough to resist damage from construction or other vehicles which may run over it.

8. To provide a device which is not easily displaced by large volumes of water runoff from a strong storm.

9. To provide a device which is light weight enough to be installed and remove by one person.

10. To provide a device which can easily be moved from one construction site to another, and easily stored when not needed.

11. To provide a device which blocks debris from entering storm sewer inlets, yet allows for very easy removal of the debris and eroded soil because they are easily accessible on the surrounding street and gutter area, and may be easily shoveled away.

12. To provide a device which is superior to current methods involving concrete blocks or wood.

13. To provide a device which is more efficient and better in appearance than current devices.

14. To provide a device which has longevity and safety.

15. To provide a device which protects the environment and reduces hazards to vehicles or persons.

16. To provide a device which meets the requirements of ICEA, EPA, and other state, local, and federal agencies.

DETAILED DESCRIPTION OF THE DRAWINGS

In the drawings, part 1 is the catch basin, part 2 is the storm sewer inlet, parts 3 are the mesh bags, part 4 is the curb, part 5 is the box, part 6 is the side walk, part 7 is the street, part 8 is the water, part 9 is the soil, parts 10 are the rods, part 11 is the mesh, parts 12 are the parallel bars, and part 13 is the open surface. Parts 14 are pieces of gravel. In the drawings, the basic box structure 5 is made of parts 10 and 12 which may be bars, rods or re-bar.

FIG. 1 is a view looking down on the Invention in place against a storm sewer storm sewer inlet 2. The sidewalk 6, curb 4 and street 7 are shown. The storm sewer inlet 2 is a generally rectangular hole in curb 4. The rectangular box 5 is shown in position in the gutter and up against the curb 4 and the storm sewer inlet 2. The top surface of box 5 is shown, for illustration purposes only, with four different varieties of its top surface. Mesh 11 is shown on a portion of the top of box 5, parallel bars 12 are shown on another portion of the top of box 5, and two portions of the top of box 5 are illustrated with an open surface 13. In reality, the top surface of box 5 would typically have only one of the three possible treatments—mesh 11, parallel bars 12, or open surface 13. In FIG. 1 mesh bags 3 are shown extending from the portion of the curb 4 on the left, around and alongside of box 5 and back to the curb 4. These mesh bags 3 typically comprise an open metal wire mesh surrounding pieces of gravel of a size large enough so that they cannot escape through the holes of the open wire mesh of mesh bags 3. As illustrated in FIG. 1, the mesh bags 3 and box 5 rest on the street 7. Water would typically be present on the surface of street 7 during and after a rain storm. The water from the rain storm would typically move eroded soil and trash and debris toward the inlet of the storm sewer 2. The mesh bags 3 allow the water to move through them while holding the eroded soil against the outside surface of the bags. The box 5 then allows water which penetrates the mesh bags 3 to fall into the storm sewer inlet 2. The box 5 also holds the mesh bags 3 in the proper position despite the water moving through them and pressing against them. A vehicle or piece of construction equipment could run over the entire assembly without displacing it or damaging it due to the strength of the rods of box 5.

Figure 2:
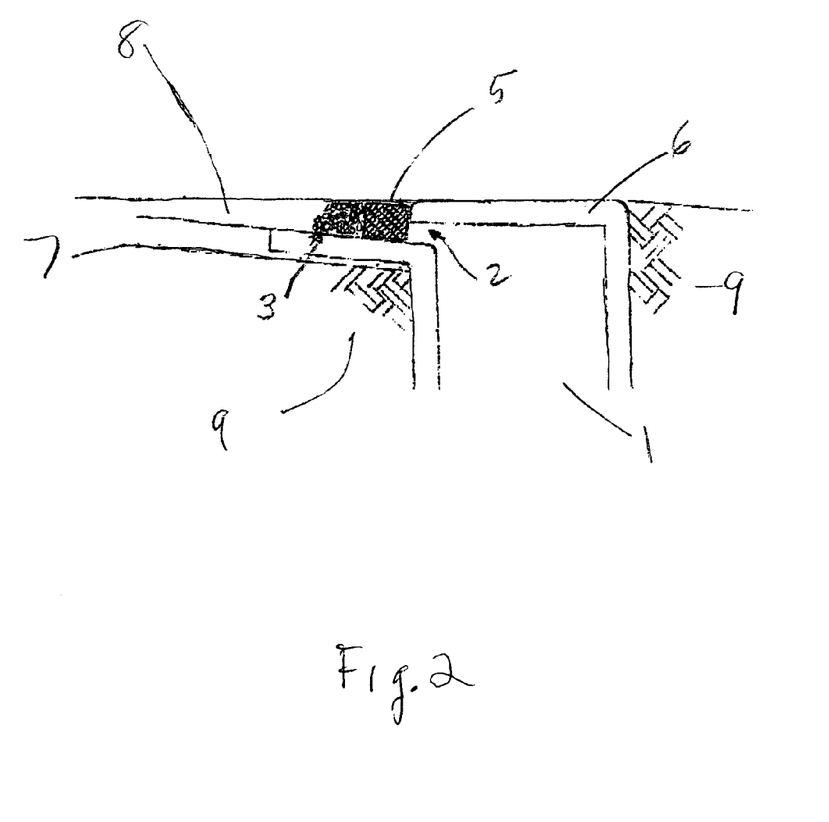
FIG. 2 is a sectional side view of the Invention in place up against a storm sewer inlet. The Figure shows an end view of the box and mesh bags.

FIG. 2 is a side sectional view of the Invention installed up against storm sewer inlet 2. The box 5 is shown pressing against storm sewer inlet 2 and mesh bags 3 are shown to the left of box 5 and pressing up against it. FIG. 2 shows one end of box 5. In the actual installation, the mesh bags 3 would curve around the small end of box 5 and continue up against the curb 4. Sidewalk 6 and street 7 are also shown as well as the soil 9 underneath the street 7 and adjoining sidewalk 6, as well as catch basin 1 of the storm sewer. The water 8 from a storm flowing through the mesh bags 3 is also shown. When the water 8 is high enough, it may flow over mesh bags 3 and through the top surface of box 5 and into storm sewer inlet 2. In the case of high water 8, the debris would press against the mesh bags 3 and the street 7 and would be held in that position by the flowing water. On the other hand, when the height of the water 8 is high enough due to a heavy flow of water, the water itself can flow over the top of mesh bags 3 and through the top surface of box 5 and then into storm sewer inlet 2.

Figure 3:
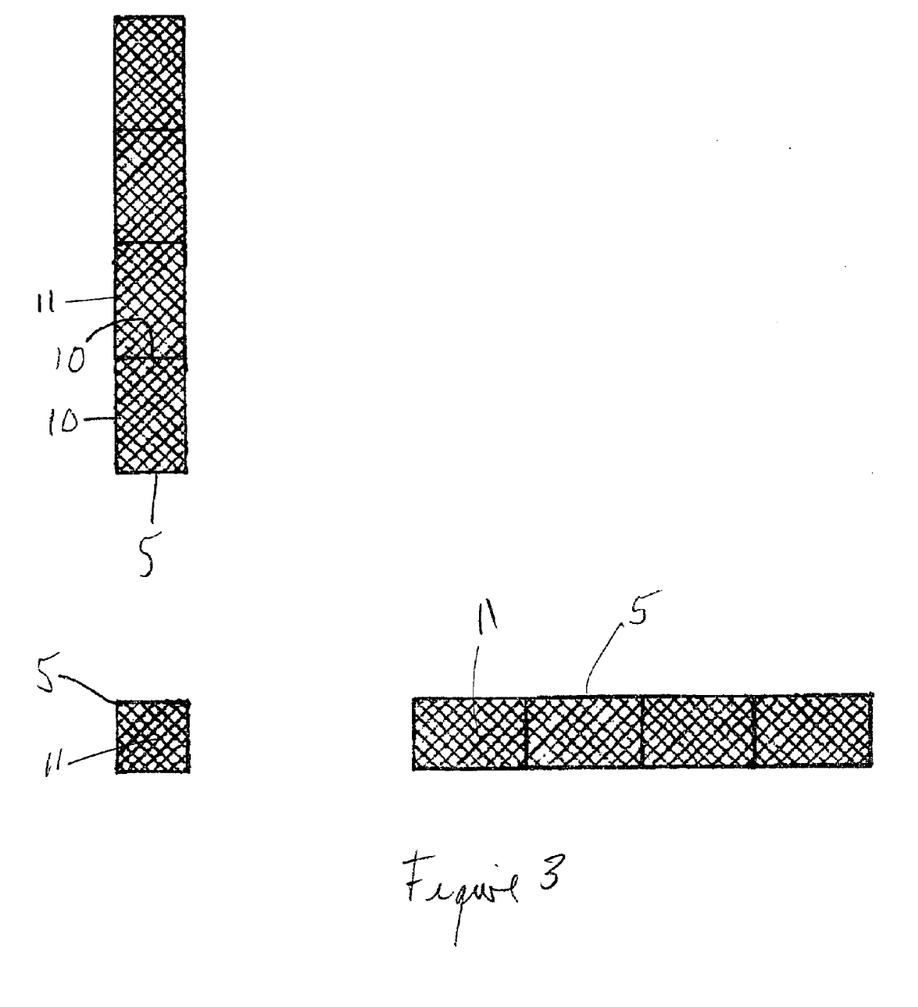
FIG. 3 shows three different views (end, long side, and top) of the box, and this version has metal mesh on all surfaces—the two ends, the two long sides and the top and bottom.
Figure 4:
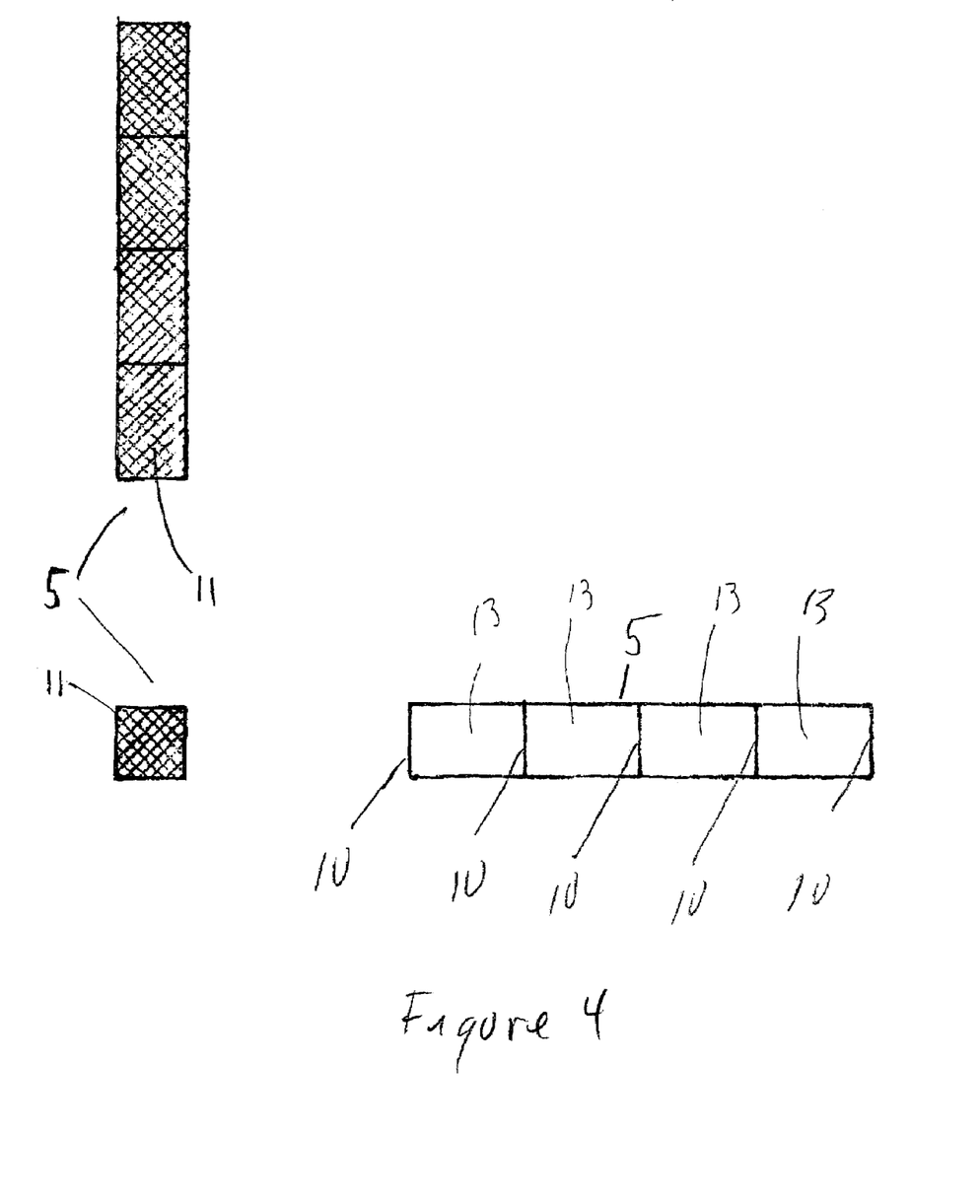
FIG. 4 is a similar view showing an end view, side view, and top view of the box. In this version of the box, five surfaces of the box are covered with metal mesh, while the top surface of the rectangular box is open except for three rods across the top surface.

FIG. 3 shows three views of box 5—an end view, a top view, and a side or bottom view. In this version of box 5, all six surfaces are covered with metal mesh. Rods 10 are shown which typically form the framework of box 5. FIG. 4 is a similar three-way view of box 5; however, in this case the bottom, ends, and the side of box 5 are covered with mesh 11. The top or open surface 13, is open except for several rods 10 which merely reinforce the structure but otherwise allow for an open top.

Figure 5:
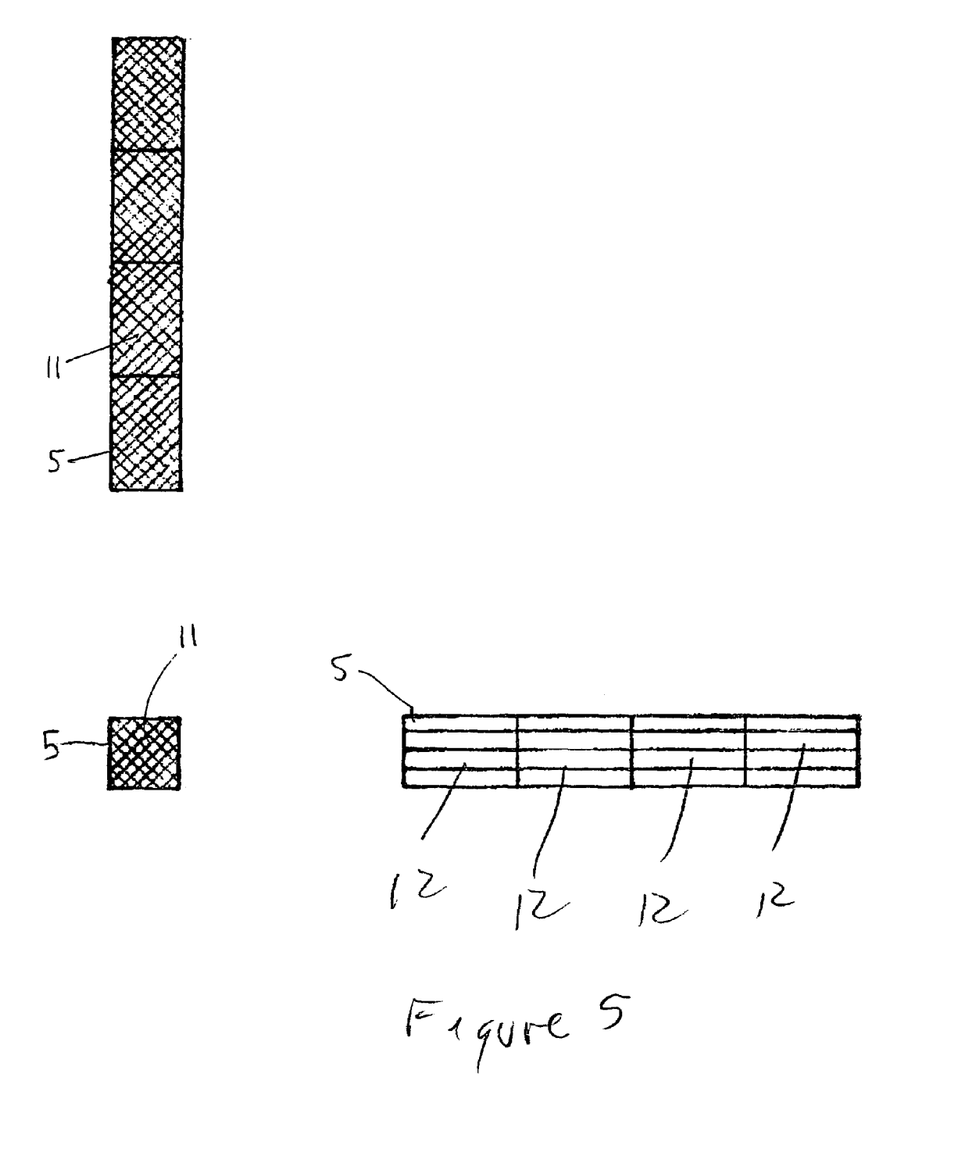
FIG. 5 is a similar view of a third variety of the Invention; it is similar to FIG. 4 except that the top is not open but has parallel metal rods across its top surface from one end to the other.

FIG. 5 is very similar to FIG. 4 except that the top surface of box 5 is reinforced with a number of parallel bars 12 running lengthwise for added strength.

Figure 6:
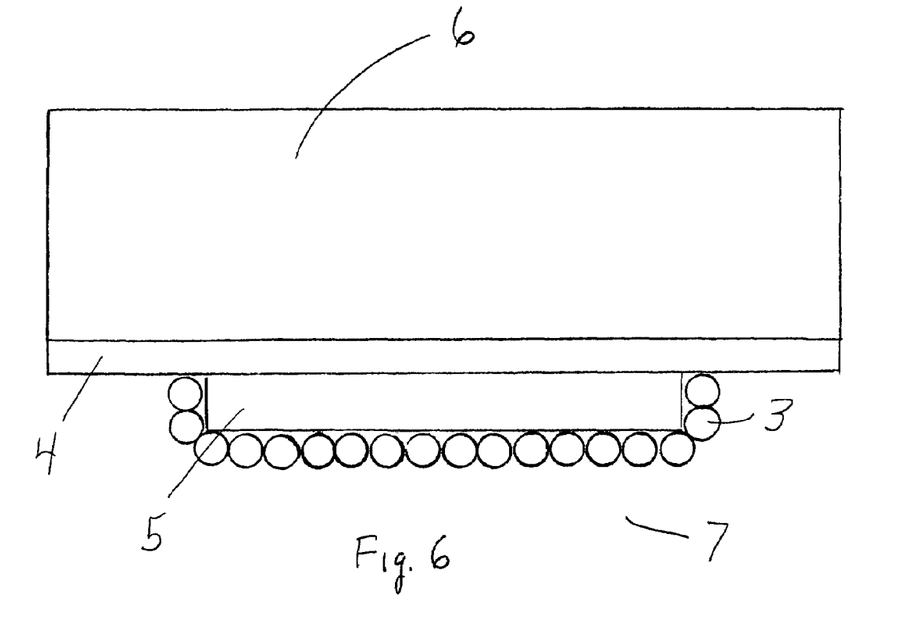
FIG. 6 shows the box and mesh bags in place against a curb.
Figure 7:
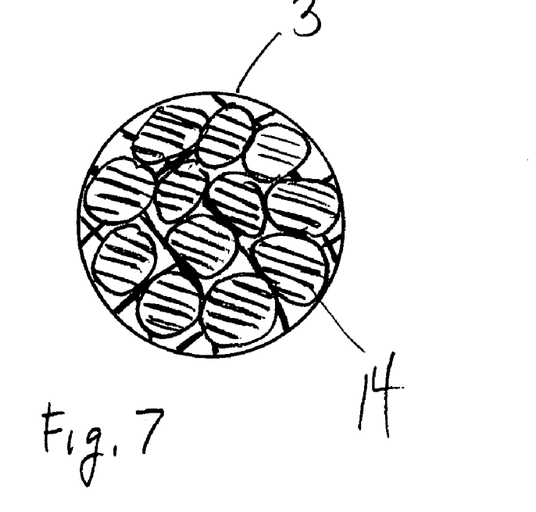
FIG. 7 shows the mesh bags.

FIGS. 6 and 7 show the placement of the mesh bags 3 around the box 5 against curb 4. In FIG. 6, the content of the mesh bags 3 is not shown. FIG. 7 shows at the top pieces of gravel 14 inside mesh bag 3, and at the bottom shows a cross section of the mesh bag 3 showing pieces of gravel 14.

DESCRIPTION—PREFERRED EMBODIMENT

In the preferred embodiment of the Invention, the box 5 would typically be made out of ⅝ inch metal re-bars comprising the frame of a regular rectangular solid about 6 by 6 inches and 4 feet long. Except for the top, bottom and one long side (the one against the curb), all of the surfaces of the box 5 would be covered with metal mesh 11. The top surface of box 5 could have three optional treatments—covered with strong steel metal mesh 11 (about ⅛ inch thick), parallel bars 12, or an open surface 13. The selection of these three treatments might depend on the importance placed on preventing any trash from entering the storm sewer inlet 2 or avoiding street flooding by being sure that overflow water from strong storms can easily pass through the top of box 5 and into storm sewer inlet 2. The mesh bags 3 would be made of open wire mesh and would contain pieces of gravel large enough to prevent them from passing through the holes in the open wire mesh. The size of the bags and amount and size of gravel contained in them could vary depending upon the maximum desired weight for each gravel bag, and the importance of preventing eroded soil from passing through the bag. The smaller the gravel in the bag, the more eroded soil that would be stopped by the bag, but in most cases, smaller gravel in the bag would mean that less water can flow through the bag, possibly causing enough trash to build up around the mesh bags to wash over them and through the top surface of the box (unless it is covered with wire mesh.) The strength of the rods forming the framework of the box 5 would be selected to be sufficient to avoid damage by a vehicle or piece of construction equipment passing over the box. Likewise, the strength of the wire mesh comprising the mesh bags would also be enough to prevent damage of the metal bags by vehicles passing over them. The dimensions of box 5 would be selected in conjunction with the strength and thickness of the re-bars 10 to be sure that the total weight of the box 5 would not exceed the strength of the person who is to install it, or a machine which is intended to lift it. The re-bars are standard #5 re-bars for reinforcing poured concrete, about ⅝ inch thick, known to those skilled in the art. An example is available from Engbar Pipe and Steel Company, 4755 Washington, Denver, Colo. 80216.

Operation of the Invention

The Invention is easy and quick to install by one person. The rectangular box is placed in a gutter on the side of a road and up against, and covering, the inlet for a storm sewer drain. The rectangular box is positioned so that the upper surface of the box is either open or has a minimum number of frame members facing upward, thereby allowing overflow of very large volumes of water from a strong storm. Once the rectangular box is in place in the gutter, several bags made of open wire mesh and containing gravel are placed around the box in order to form a continuous barrier of mesh bags from the curb on one side of the box, around the box, and back to the curb on the other side of the box. During a storm, runoff water may wash eroded soil toward the Invention from the street and the gutter. The gravel in the wire mesh bags will prevent the majority of eroded soil from being washed into the storm sewer inlet. In fact, once some eroded soil is washed up against the mesh bags, the soil acts an additional filter with respect to more eroded soil being washed up against the Invention. Likewise the gravel filled mesh bags will prevent trash, construction debris or other refuse from being washed into the storm drain. If there is an unusually high volume of water from a strong storm, the eroded soil and debris will be blocked as mentioned above, yet excess storm water can move over the gravel filled bags and through the upper surface of a rectangular box which is predominantly open, and thereafter into the storm sewer inlet. This would prevent street flooding. The rectangular box has several important functions. First, it stabilizes and makes secure the entire structure in the gutter and up against the storm sewer inlet despite the substantial pressure of moving water. It prevents the gravel filled bags from washing up against the storm sewer inlet and either blocking the inlet or being themselves washed into the inlet. The rectangular box also provides the vital function of allowing excess water, beyond water which can be filtered through the mesh bags, and which may move over the mesh bags, to flow into the storm sewer inlet, while the mesh bags and the metal bar structure of the box remain in position against the curb, and the mesh bags prevent eroded soil and trash from flowing into the storm sewer inlet. The strong rectangular box also allows vehicles or construction equipment to run over the entire Invention without crushing it or displacing it from its proper position. Other devices which attempt to prevent eroded soil and trash from being washed into storm sewer inlet, can be easily blocked by a large amount of debris, and cannot handle large volumes of water, thereby causing flooding in the area of the storm sewer inlet. After the storm is over, the debris and eroded soil can be easily removed by shoveling, because both the eroded soil and the debris are easily within reach of a shovel and remain in the area surrounding the mesh bags, not somewhere inside the sewer inlet. Since the Invention is in several parts, the box and several gravel filled bags, the Invention can be easily installed and removed by one person since none of the component parts is excessively heavy.

Tests

The device has performed with great success in active construction sites in Douglas and Arapahoe Counties in Colorado. Inspectors have monitored its performance regularly.

Additional Embodiments

Additional embodiments involve different configurations for the top of the box. Alternatives are shown in FIG. 1 including cross mesh, parallel rods, open top, etc. Other elongated shapes for the box are possible besides rectangular, including an elongated tube with circular or polygonal cross section. Strong plastic rods could be used to construct the box if the plastic is strong enough and more plastic parts are used closer together to provide the necessary strength. The Invention also includes the method of using the box and mesh bags to prevent eroded soil and trash from being washed or blown by air into a storm sewer inlet, as described above and as illustrated by the Figures.

Conclusions, Ramifications and Scope

A number of changes are possible to the structures and parts described above while still remaining within the scope and spirit of the Invention. The specifics about the form of the Invention described in this application are not intended to be limiting in scope. The scope of the Invention is to be determined by the claims and their legal equivalents, not the examples given above.

I claim:
1. A street storm sewer inlet grate system comprising:
   (a) a box structure substantially open on its inside and sized and shaped to be placed against, and covering, a storm sewer inlet,
   (b) mesh or rods covering some or all of the surfaces of the box, and
   (c) a plurality of mesh bags, separate from each other and from the box structure and not connected to each other or the box structure, and individually capable of being placed on, and removed from, the street surface, each individual bag containing gravel or other lumps of solid dense material, placed against each other, and around the box, on the surface of the street from one side of the storm sewer inlet to the other,
   whereby the storm sewer inlet is substantially covered by the box structure, whereby the mesh bags form a continuous barrier on the surface of the street around the box from one side of the storm sewer inlet to the other, and whereby trash and eroded soil are prevented from being washed by water or blown by air into the storm sewer inlet, and whereby because of their weight, the bags strongly resist movement out of position by the force of flowing water.

2. The system of claim 1, wherein the box is elongated and sized and shaped to be positioned in a street curb containing a storm sewer inlet.

3. The device of claim 2, wherein the box has an elongated rectangular shape or an elongated tubular shape of circular or polygonal cross-section.

4. The device of claim 1, wherein some or all of the surfaces of the box are covered with mesh except for the top.

5. The device of claim 2, wherein some or all of the surfaces of the box are covered with mesh except for the top.

6. The device of claim 3, wherein some or all of the surfaces of the box are covered with mesh except for the top.

7. The device of claim 1, wherein the box structure is made of rods.

8. The device of claim 2, wherein the box structure is made of rods.

9. The device of claim 3, wherein the box structure is made of rods.

10. The device of claim 4, wherein the box structure is made of rods.

11. The device of claim 5, wherein the box structure is made of rods.

12. The device of claim 6, wherein the box structure is made of rods.

13. The device of claim 7, wherein the box structure is made of metal re-bar rods.

14. The device of claim 8, wherein the box structure is made of metal re-bar rods.

15. The device of claim 9, wherein the box structure is made of metal re-bar rods.

16. The device of claim 10, wherein the box structure is made of metal re-bar rods.

17. The device of claim 11, wherein the box structure is made of metal re-bar rods.

18. The device of claim 12, wherein the box structure is made of metal re-bar rods.

19. The device of claim 1, wherein the box is sized and shaped to rest in a street gutter including a curb, up against a storm sewer inlet in the gutter curb, and wherein the plurality of separate mesh bags are sized and shaped to rest on the surface of the street gutter and surrounding street, and extend from the gutter curb at one end of the box, around the portion of the box away from the curb, and back to the curb at the other end of the box.

20. A method of preventing trash and eroded soil from being washed by water or blown by air into a storm sewer inlet in a street or gutter of a street, comprising the steps of:
 (a) placing a box structure substantially open on its inside and having mesh or rods covering some or all of the surfaces of the box against, and covering, the storm sewer inlet in a street or gutter, and
 (b) placing, on the surface of the street, a plurality of mesh bags, separate from each other and from the box structure and not connected to each other or the box structure, and individually capable of being placed on, and removed from the street surface, each individual bag containing gravel or other lumps of solid dense material, against each other from the street or gutter area at one end of the storm sewer inlet, around the box structure, and to the gutter or street area at the other end of the storm sewer inlet, whereby the bags form a continuous barrier, on the surface of the street, around the box from one end of the storm sewer inlet to the other, and whereby eroded soil and trash are substantially prevented from being washed by water or blown by a air into the storm sewer inlet, and whereby because of their weight, the bags strongly resist movement out of position by the force of flowing water.

* * * * *